United States Patent
Baeyens et al.

(10) Patent No.: US 7,155,130 B2
(45) Date of Patent: Dec. 26, 2006

(54) NRZ-TO-RZ CONVERSION FOR COMMUNICATION SYSTEMS

(75) Inventors: Yves L. Baeyens, Gillette, NJ (US); Young-Kai Chen, Berkeley Heights, NJ (US); Wei-Chiao W. Fang, Middletown, NJ (US); Andreas Leven, Gillette, NJ (US); Eugene F. Rice, Highland park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 666 days.

(21) Appl. No.: 10/085,433

(22) Filed: Feb. 28, 2002

(65) Prior Publication Data

US 2004/0223765 A1    Nov. 11, 2004

(51) Int. Cl.
*H04B 10/04* (2006.01)
*H04B 10/12* (2006.01)

(52) U.S. Cl. ..................... 398/182; 398/183
(58) Field of Classification Search ............. 398/82, 398/154, 161, 183, 201, 182, 186; 359/181; 341/68, 69; 375/293, 359, 360, 361
See application file for complete search history.

(56) References Cited

U.S. PATENT DOCUMENTS

| | | | |
|---|---|---|---|
| 5,060,225 A * | 10/1991 | Godfrey | 398/79 |
| 5,610,606 A * | 3/1997 | Fukunaga et al. | 341/143 |
| 6,031,413 A * | 2/2000 | Mizoguchi | 327/538 |
| 6,100,716 A * | 8/2000 | Adham et al. | 326/68 |
| 6,114,981 A * | 9/2000 | Nagata | 341/143 |
| 6,559,996 B1 * | 5/2003 | Miyamoto et al. | 398/183 |
| 6,718,142 B1 * | 4/2004 | Murai | 398/183 |
| 6,850,713 B1 * | 2/2005 | Kikuchi et al. | 398/201 |
| 2002/0109893 A1 * | 8/2002 | Givehchi | 359/181 |
| 2002/0171903 A1 * | 11/2002 | Walklin | 359/238 |

\* cited by examiner

*Primary Examiner*—M. R. Sedighian

(57) ABSTRACT

A driver, e.g., for use with electro-optic (E/O) modulators. The driver is configured to generate a driving signal based on an electronic NRZ input data signal and an input clock signal. The driver converts the NRZ input data signal to an RZ format and produces an amplified RZ signal that can be applied to an E/O modulator. The amplification gain of the driver is adjustable to enable interfacing with different modulators. In one embodiment of the invention, the driving signal is generated based on a comparison between the NRZ input data signal and an offset clock signal generated from the input clock signal. The width of pulses in the driving signal, e.g., corresponding to logical "ones," may be tuned by, e.g., changing the DC offset of the clock signal. The driver may be implemented as an ASIC configured to operate at the data rate of, e.g., 10 GBit/s.

32 Claims, 5 Drawing Sheets

NRZ-TO-RZ CONVERSION FOR COMMUNICATION SYSTEMS

BACKGROUND OF THE INVENTION

1. Field of the Invention

The present invention relates to communication equipment.

2. Description of the Related Art

Different waveforms may be used to transmit digital data streams. Two such waveforms (non-return-to-zero (NRZ) and return-to-zero (RZ)) of particular relevance to the present invention can be characterized as follows. In an NRZ data stream, two consecutive bits of logical "ones" represented by a high level in the carrier signal are transmitted without the carrier signal falling to a low level between the bits. In contrast, in an RZ data stream, the carrier signal returns to the low level between bits. For example, an NRZ signal representing a relatively long string of logical "ones" appears to have a DC nature, while an RZ signal representing the same string appears as a sequence of pulses.

Most electronic systems transfer data using NRZ. Similarly, in fiber optic communication systems, on/off modulation of laser light using NRZ is the most commonly used method of data transmission. However, substituting NRZ with RZ is being increasingly considered in modern optical network designs, since the latter can provide certain advantages. For example, in long distance transmission, an RZ optical signal is less susceptible to non-linearities and polarization mode dispersion than a corresponding NRZ optical signal. Therefore, converting NRZ electronic data streams into optical RZ signals for transmission over optical networks is an emerging need.

FIG. 1 shows a typical prior art system 100 for converting an NRZ electronic data stream 102 into an RZ optical signal 104. System 100 comprises an optional multiplexer (MUX) 120 for combining two or more tributary NRZ data signals 118 into data stream 102 and deriving a reference clock signal 112. Signal 112 may be a sine wave at a reference clock frequency. System 100 further comprises a laser 106 that generates a continuous wave (CW) beam of light. This beam is fed into an optical fiber and transmitted to a first electro-optic (E/O) modulator 108. Modulator 108 is configured to generate an optical pulse train using a modulator driver 114 receiving input signal 112. The output of modulator 108 is then an optical pulse train at that frequency. The output of modulator 108 is fed into a second E/O modulator 110, which can be similar to modulator 108. Modulator 110 is configured to modulate the optical pulse train using a second modulator driver 116 receiving data stream 102. The output of modulator 110 is RZ optical signal 104.

One problem with system 100 is that it requires two E/O modulators (108 and 110) and two modulator drivers (114 and 116) adding to the cost of the system. Another problem with system 100 is that it requires synchronizing an optical pulse train generated by modulator 108 and electronic data stream 102. Such synchronization is difficult to maintain due to often occurring and, in general, poorly controllable phase drifts in E/O modulators and/or associated electronics.

SUMMARY OF THE INVENTION

Embodiments of the present invention provide a driver, e.g., for use with electro-optic (E/O) modulators. The driver is configured to generate a driving signal based on an electronic NRZ input data signal and an input clock signal. The driver converts the NRZ input data signal to an RZ format and produces an amplified RZ signal that can be applied to a single E/O modulator. The amplification gain of the driver is adjustable to enable interfacing with different modulators. In one embodiment of the invention, the driving signal is generated based on a comparison between the NRZ input data signal and an offset clock signal generated from the input clock signal. The width of pulses in the driving signal, e.g., corresponding to logical "ones," may be tuned by, e.g., changing the DC offset of the clock signal. The driver may be implemented as an ASIC configured to operate at the data rate of, e.g., 10 GBit/s.

According to one embodiment, the present invention is an apparatus for converting a non-return-to-zero data signal to a return-to-zero data signal, the apparatus comprising an amplifier configured to generate an amplified RZ data signal corresponding to the NRZ data signal based on (i) the NRZ data signal and (ii) a clock signal synchronized with the NRZ data signal.

According to another embodiment, the present invention is a method for converting a non-return-to-zero data signal to a return-to-zero data signal, the method comprising the steps of: (a) generating one or more control signals based on (i) the NRZ data signal and (ii) a clock signal synchronized with the NRZ data signal; and (b) generating an amplified RZ data signal corresponding to the NRZ data signal based on said one or more control signals.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Although the invention is particularly suitable for use with communications equipment those skilled in the art can appreciate that the invention can be equally applied to other types of electrical and/or optical equipment.

Figure 1:
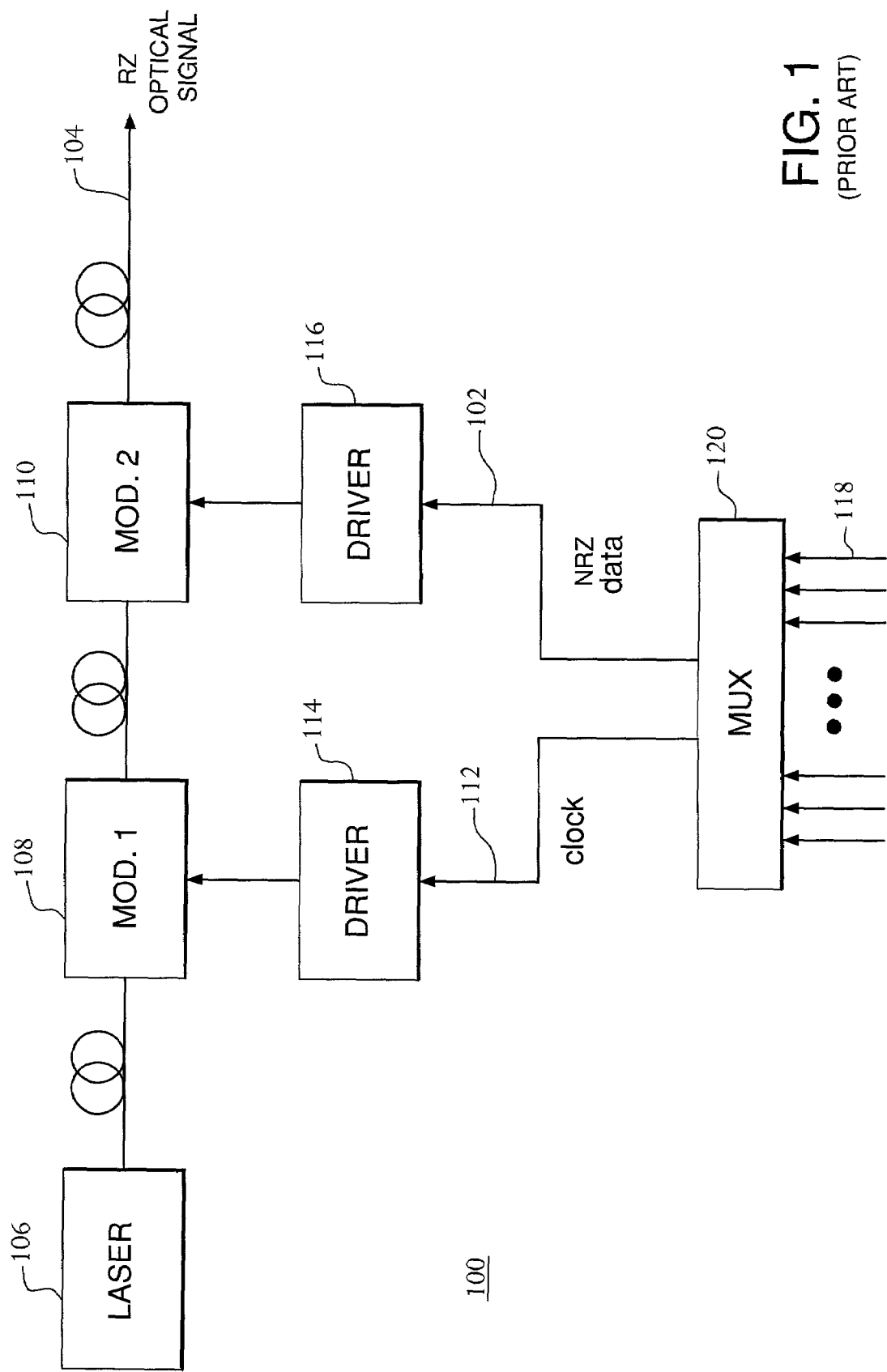
FIG. 1 shows a prior art system for conversion of an electronic NRZ data stream to an optical RZ signal.
Figure 2:
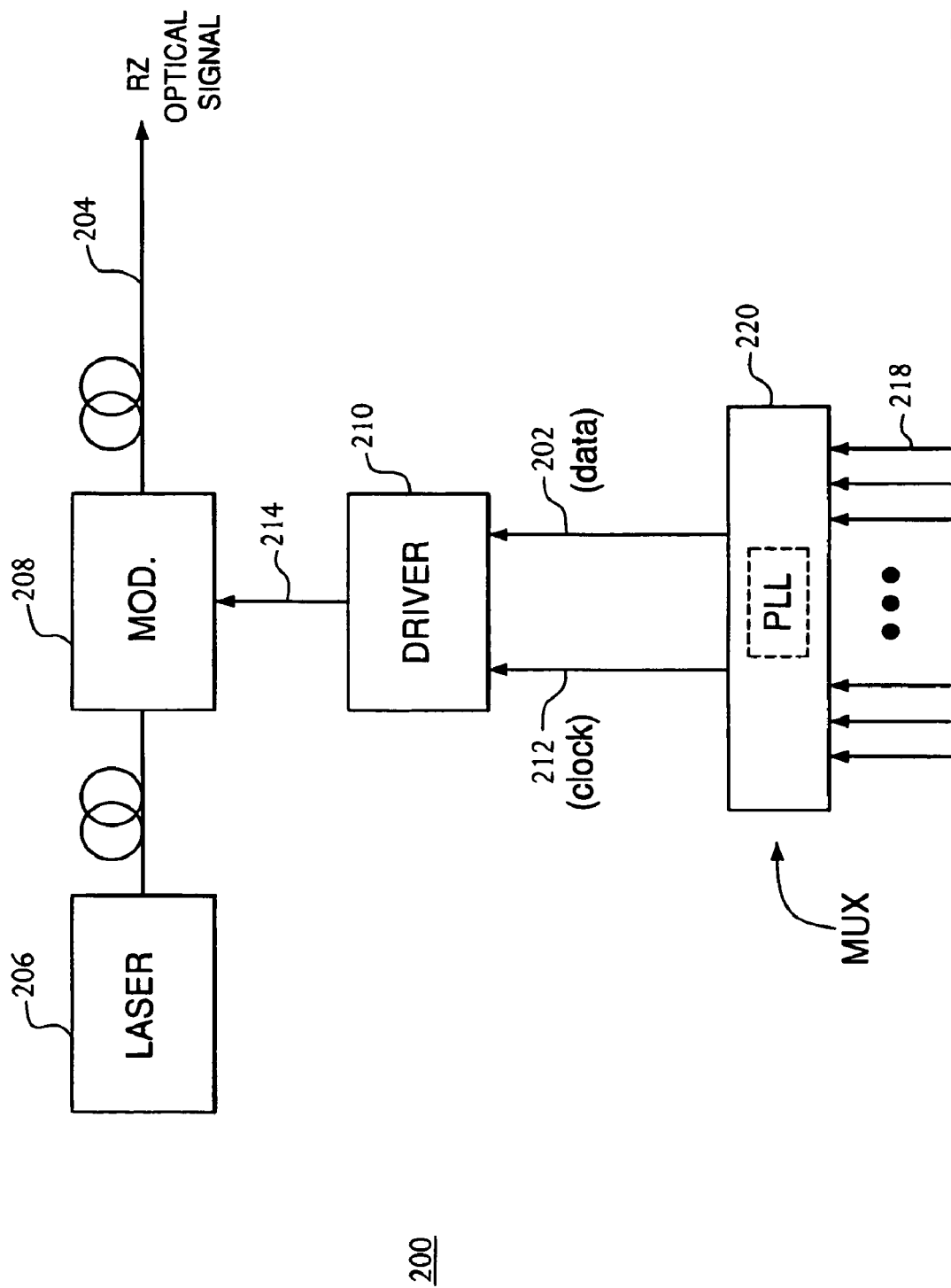
FIG. 2 shows a system for conversion of one or more electronic NRZ data streams to an optical RZ signal according to one embodiment of the present invention.

FIG. 2 shows a system 200 for conversion of one or more electronic NRZ data streams 218 to a single RZ optical signal 204 according to one embodiment of the present invention. System 200 comprises a multiplexer (MUX) 220 optionally configured to combine two or more relatively low-bit-rate tributary NRZ data streams 218 into a relatively high-bit-rate trunk NRZ data stream 202. In one embodiment, MUX 220 may be configured to combine sixteen 666 MBit/s tributary data streams 218 into one 10.66 GBit/s trunk data stream 202. In other embodiments, a different number of tributary data streams 218 having a different bit rate may be combined into trunk data stream 202 having a corresponding higher bit rate. MUX 220 is further configured to generate a clock signal 212 synchronized with data stream 202. In one embodiment, MUX 220 includes a phase-locked loop (PLL) circuit for locking the phase of the PLL output to signal 202, which PLL output may be used as signal 212. Signal 212 is preferably a sine wave, although any suitable periodic waveform may be used.

System 200 further comprises an E/O modulator 208 configured to receive through an optical fiber a CW beam of light (e.g., having a wavelength of 1550 nm) generated by a laser 206 (e.g., a laser diode). Modulator 208 is further configured to generate optical signal 204 using a driving signal 214 applied to the modulator by a modulator driver 210. In one possible implementation, modulator 208 operates as follows. When signal 214 is at a low level, modulator 208 outputs a high level of optical signal corresponding to that fed into the modulator from laser 206. When signal 214 is at a high level, modulator 208 outputs a low level of optical signal, preferably substantially no light. Modulator 208 may be, e.g., a lithium niobate Mach-Zhender (MZ) type modulator or other suitable modulator.

To generate signal 214, driver 210 receives two input signals: (1) NRZ data stream 202 and (2) clock signal 212. Signal 214 is such that (i) it is of suitable amplitude to drive modulator 208 and (ii) it represents the data of NRZ data stream 202 in an RZ format. In one embodiment, driver 210 may be configured to have a variable output to enable interfacing with different modulators. For example, for driving the aforementioned MZ modulator, driver 210 may be set to generate signal 214 having the negative low level of about −4 V and the high level of about 0 V.

Figure 3A:
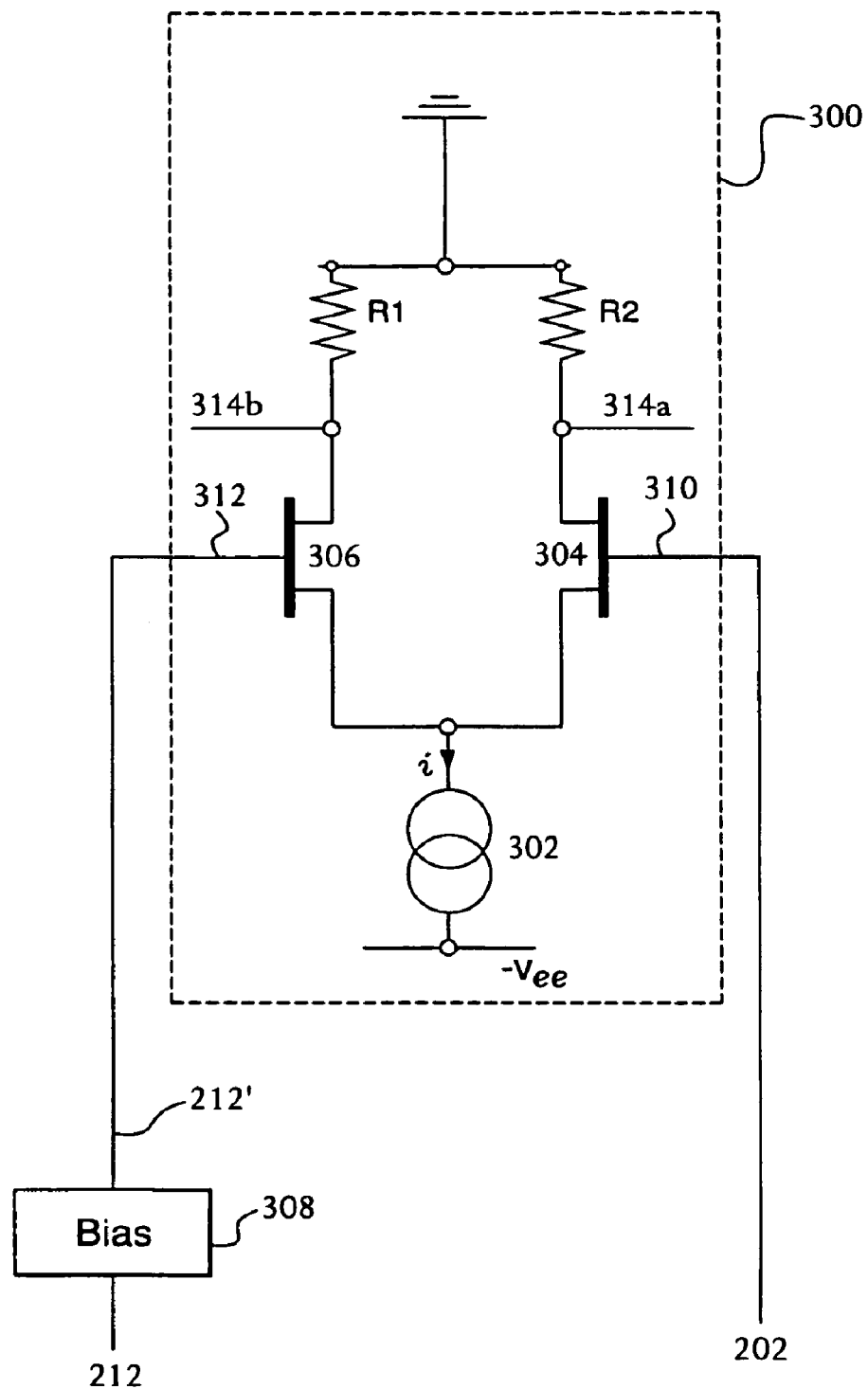
FIGS. 3A–B show schematic diagrams of a modulator driver that can be used in the system of FIG. 2 according to representative embodiments of the present invention.
Figure 3B:
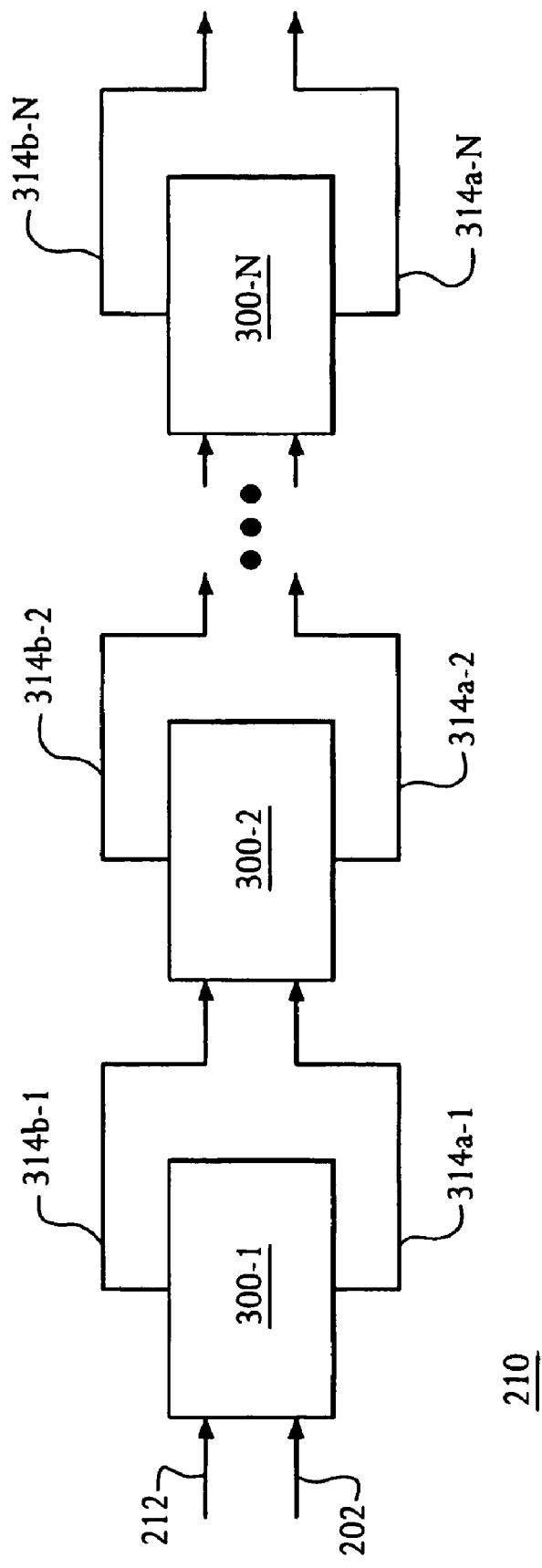

FIGS. 3A–B show schematic diagrams of driver 210 according to representative embodiments of the present invention. Referring to FIG. 3A, in one embodiment, driver 210 comprises a differential amplifier 300 and an optional bias tee 308. Bias tee 308 is configured to offset signal 212 to produce an offset clock signal 212'. Amplifier 300 is configured to generate signals 314a and 314b based on signals 202 and 212'. For example, when signal 202 is greater than signal 212', amplifier 300 may be configured to set signals 314a and 314b to a high and low level, respectively. Similarly, when signal 202 is less than or equal to signal 212', amplifier 300 may be configured to set signals 314a and 314b to a low and high level, respectively. Depending on the particular modulator used in system 200, either one of signals 314a and 314b may be used as signal 214 applied to modulator 208. In addition, both signals 314a and 314b may be applied to modulators requiring dual-drive (differential) inputs for their operation.

In one embodiment of the present invention, amplifier 300 comprises a constant current source 302, switches 304 and 306, and resistors R1 and R2. Control signals 310 and 312 are applied to switches 304 and 306, respectively, to control their state. The following is an example of how switches 304 and 306 may be operated. When signal 310 is greater than signal 312, switch 304 is closed and switch 306 is open. At this state of the switches, the current (i) generated by current source 302 flows through resistor R1 producing the negative low potential of −i(R1) at output 314b and zero potential at output 314a. Alternatively, when signal 310 is less than or equal to signal 312, switch 304 is open and switch 306 is closed. At this state of the switches, the current flows through resistor R2 producing the negative low potential of −i(R2) at output 314a and zero potential at output 314b.

Therefore, depending on the relative value of signals 310 and 312, signals 314a and 314b alternate between a first negative low level (−i(R1)) and a first high level (zero) and a second negative low level (−i(R2)) and a second high level (zero), respectively. Furthermore, when signal 314a is at its low level, signal 314b is at its high level, and vice versa. Changing the values of i, (R1), and/or (R2) may then be used to adjust the gain of amplifier 300 for driving the specific modulator 208. In a preferred embodiment, (R1)=(R2).

In one embodiment, control signals 310 and 312 may be signals 202 and 212', respectively, as shown in FIG. 3A. In that case, driver 210 utilizes the natural behavior of differential amplifier 300 to act both as a comparator and an amplifier. In other embodiments, control signals 310 and 312 may be generated based on signals 202 and 212 by conditioning (e.g., scaling, offsetting, and/or performing logical functions with) those signals. Corresponding additional circuitry may be required to perform such conditioning.

In one implementation of amplifier 300, switches 304 and 306 may be realized as field-effect transistors (FETs). Depending on the particular technology, the switching characteristics of the FETs may not be those of ideal switches. As a result, driver 210 may be configured to include two or more stages (e.g., cascaded amplifiers 300-1–300-N shown in FIG. 3B) to improve performance. In one embodiment, a second amplifier 300 may be added as follows. Outputs 314a and 314b of the first amplifier 300 (e.g., one shown in FIG. 3A) are used as control signals 310 and 312, respectively, in the second amplifier 300. Then, either output signal 314a or 314b of the second amplifier 300 is applied as signal 214 to modulator 208. Additional amplifiers 300 may be added to driver 210 in a similar fashion.

Figure 4:
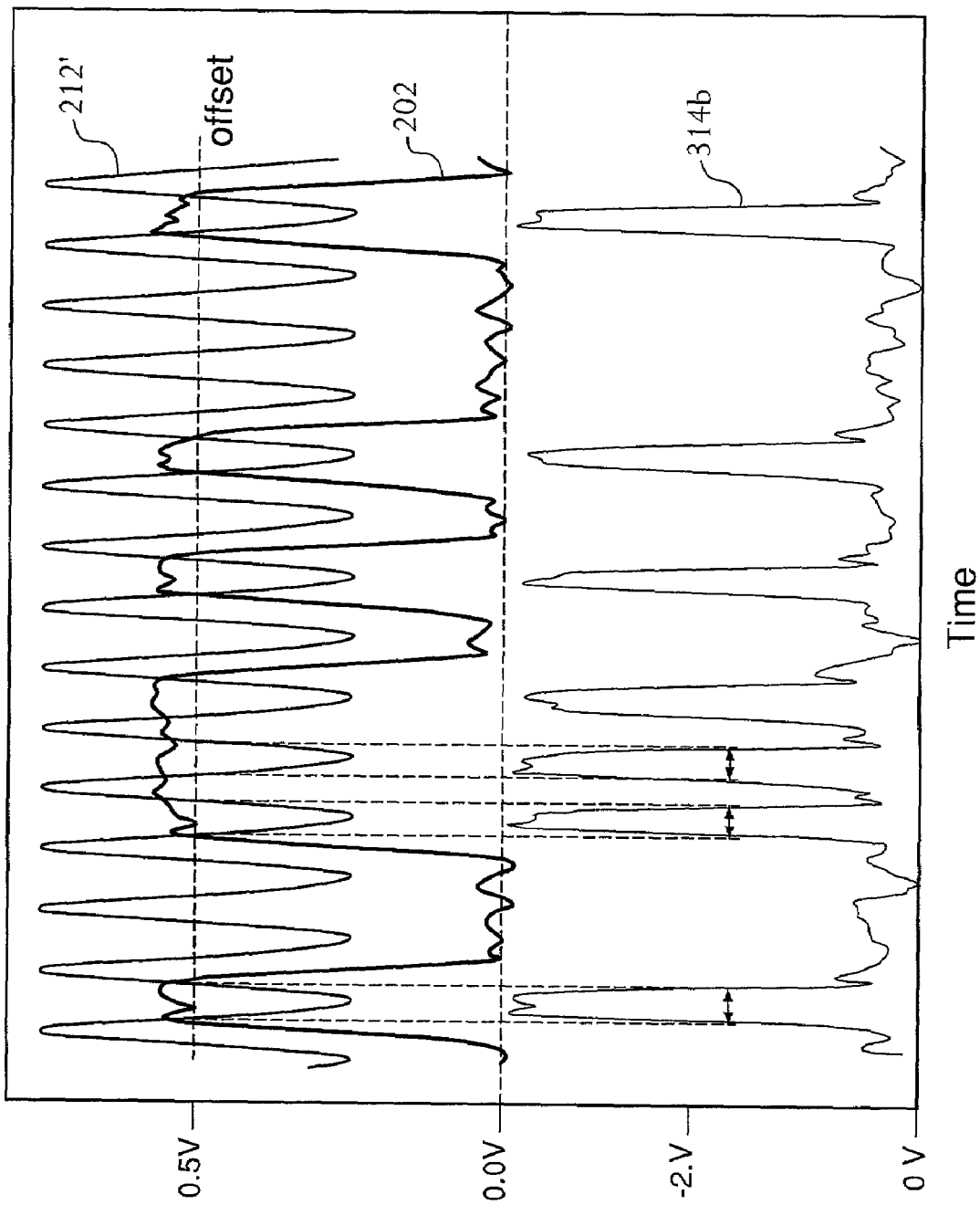
FIG. 4 depicts representative signals used in operation of the modulator driver of FIG. 3.

FIG. 4 further explains the operation of driver 210. Representative signals 202, 212', and 314b are shown. For the configuration illustrated by FIG. 4, sine wave clock signal 212 is positively offset in bias tee 308 of driver 210 by about 0.5 V to produce signal 212'. In a different configuration, a negative offset value may be applied to signal 212, e.g., if data signal 202 has the opposite polarity. Referring again to FIG. 4, vertical dotted lines show for the first five bits (10011) of signal 202 the instances when signal 212' intercepts (is equal to) data signal 202, thus causing amplifier 300 to change the state of switches 304 and 306. As is clear from FIG. 4, driver 210 converts NRZ data stream 202 into the corresponding RZ signal (signal 314b), the amplitude of which is greater than the amplitude of the original signal by approximately a factor of eight (corresponding to the gain of amplifier 300). As already discussed above, this gain may be adjusted to meet the particular requirements to the driving signal for modulator 208.

FIG. 4 further illustrates how driver 210 may be configured to change the width of output pulses in signal 214 and, therefore, to control the width of optical pulses in signal 204. The latter may be used, e.g., for pulse shaping in soliton-based long-haul optical transmission systems. Vertical dotted lines in FIG. 4 show the relation between the pulse widths in signal 314b and the corresponding interception points of signals 202 and 212'. It is clear from FIG. 4 that changing the DC offset of signal 212' relative to signal 202 will shift the position of said interception points. This, in turn, will cause the width of pulses in signal 314b to change. For example, increasing the DC offset of signal 212' (horizontal dotted line in FIG. 4) will decrease the width of pulses in signal 314b and vice versa. Thus, driver 210 can control the width of pulses in its output by, e.g., offsetting its input signals in bias tee 308.

Driver 210 may be implemented using any suitable electronic device technology, without limitation, as an ASIC using, e.g., Si-CMOS (complementary metal-oxide-semiconductor) or GaAs-PHEMT (pseudomorphic high electron mobility transfer) technologies, or as discrete circuit elements. Driver 210 may be adapted to operate at different data rates (e.g., 10, 20, or 40 GBit/s) and to accept clock signals represented by different waveforms. Driver 210 may be further adapted to be compatible with different modulators receiving light at different wavelengths. Furthermore, driver 210 may be configured for use with pure electronic circuits, not necessarily driving E/O modulators.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

What is claimed is:

1. An apparatus for converting a non-return-to-zero (NRZ) data signal to a return-to-zero (RZ) data signal, the apparatus comprising an amplifier configured to generate an amplified RZ data signal corresponding to the NRZ data signal based on (i) the NRZ data signal and (ii) a clock signal synchronized with the NRZ data signal, wherein:
   the amplifier is a differential amplifier configured to generate the amplified RZ data signal based on a comparison between a first signal corresponding to the NRZ data signal and a second signal corresponding to the clock signal, wherein the differential amplifier comprises a constant current source and two switches connected to the current source, wherein the first and second signals are applied to said two switches to generate the amplified RZ data signal; and
   there is a DC offset between the first and second signals.

2. The apparatus of claim 1, wherein the first signal is the NRZ data signal.

3. The apparatus of claim 1, wherein the width of pulses representing data in the amplified RZ data signal is controlled by the DC offset value.

4. The apparatus of claim 1, further comprising circuitry configured to condition at least one of the NRZ data signal and the clock signal to produce at least one of the first and second signals.

5. The apparatus of claim 1, wherein:
   (i) if the first signal is greater than the second signal, the amplified RZ data signal is at a low level; and
   (ii) if the first signal is less than the second signal, the amplified RZ data signal is at a high level.

6. The apparatus of claim 1, wherein the amplifier comprises two or more cascaded instances of an amplification stage.

7. The apparatus of claim 1, wherein the apparatus is implemented as an integrated circuit.

8. The apparatus of claim 1, wherein:
   the NRZ data signal is a trunk NRZ data signal; and
   the apparatus further comprises a multiplexer configured to combine two or more tributary NRZ data signals into the trunk NRZ data signal.

9. The apparatus of claim 8, wherein the multiplexer is further configured to generate the clock signal.

10. The apparatus of claim 9, wherein the multiplexer includes a phase-locked loop circuit configured to lock the phase of the clock signal to the trunk NRZ data signal.

11. The apparatus of claim 1, further comprising an electro-optic (E/O) modulator configured to receive an optical input from a laser and to modulate said optical input using the amplified RZ data signal to output an optical RZ data signal corresponding to the amplified RZ data signal.

12. The apparatus of claim 11, further comprising the laser, wherein said laser is configured to generate continuous wave light emission.

13. The apparatus of claim 1, further comprising a multiplexer configured to combine two or more tributary NRZ data signals into the NRZ data signal, wherein:
   the first signal and the second signal are applied to said two switches to generate the amplified RZ data signal based on a comparison between said first and second signals.

14. The apparatus of claim 13, further comprising
   a laser configured to generate continuous wave light emission; and
   an electro-optic (E/O) modulator configured to receive an optical input from the laser and to modulate said optical input using the amplified RZ data signal to output an optical RZ data signal corresponding to the amplified RZ data signal.

15. The apparatus of claim 1, further comprising a circuit adapted to generate a sinusoidal signal, said sinusoidal signal being the clock signal synchronized with the NRZ data signal.

16. The apparatus of claim 1, wherein there is a fixed DC offset between the first and second signals.

17. The apparatus of claim 1, wherein the second signal has a substantially constant amplitude.

18. The apparatus of claim 1, wherein the second signal does not carry data.

19. A method for converting a non-return-to-zero (NRZ) data signal to a return-to-zero (RZ) data signal, the method comprising the steps of:
   (a) generating one or more control signals based on (i) the NRZ data signal and (ii) a clock signal synchronized with the NRZ data signal; and
   (b) generating an amplified RZ data signal corresponding to the NRZ data signal based on said one or more control signals, wherein:
   step (b) comprises the step of generating the amplified RZ data signal based on a comparison between a first signal corresponding to the NRZ data signal and a second signal corresponding to the clock signal, wherein there is a DC offset between the first and second signals;
   the NRZ data signal is a trunk NRZ data signal; and
   step (a) comprises the step of combining two or more tributary NRZ data signals into the trunk NRZ data signal.

20. The method of claim 19, wherein the first signal is the NRZ data signal.

21. The method of claim 19, wherein for step (b):
   (i) if the first signal is greater than the second signal, the amplified RZ data signal is at a low level; and
   (ii) if the first signal is less than the second signal, the amplified RZ data signal is at a high level.

22. The method of claim 19, further comprising generating a sinusoidal signal, said sinusoidal signal being the clock signal synchronized with the NRZ data signal.

23. The method of claim 19, wherein there is a fixed DC offset between the first and second signals.

24. The method of claim 19, wherein the second signal has a substantially constant amplitude.

25. The method of claim 19, wherein the second signal does not carry data.

26. An apparatus for converting a non-return-to-zero (NRZ) data signal to a return-to-zero (RZ) data signal, the apparatus comprising an amplifier configured to generate an amplified RZ data signal corresponding to the NRZ data signal based on (i) the NRZ data signal and (ii) a clock signal synchronized with the NRZ data signal, wherein:
   the amplifier is a differential amplifier configured to generate the amplified RZ data signal based on a comparison between a first signal corresponding to the NRZ data signal and a second signal corresponding to the clock signal, wherein:
      (i) if the first signal is greater than the second signal, the amplified RZ data signal is at a low level; and
      (ii) if the first signal is less than the second signal, the amplified RZ data signal is at a high level.

27. A method for converting a non-return-to-zero (NRZ) data signal to a return-to-zero (RZ) data signal, the method comprising the steps of:
   (a) generating one or more control signals based on (i) the NRZ data signal and (ii) a clock signal synchronized with the NRZ data signal; and
   (b) generating an amplified RZ data signal corresponding to the NRZ data signal based on said one or more control signals, wherein:
      step (b) comprises generating the amplified RZ data signal based on a comparison between a first signal corresponding to the NRZ data signal and a second signal corresponding to the clock signal, wherein:
         (i) if the first signal is greater than the second signal, the amplified RZ data signal is at a low level; and
         (ii) if the first signal is less than the second signal, the amplified RZ data signal is at a high level.

28. An apparatus for converting a non-return-to-zero (NRZ) data signal to a return-to-zero (RZ) data signal, the apparatus comprising an amplifier configured to generate an amplified RZ data signal corresponding to the NRZ data signal based on (i) the NRZ data signal and (ii) a clock signal synchronized with the NRZ data signal, wherein:
   the amplifier is a differential amplifier configured to generate the amplified RZ data signal based on a comparison between a first signal corresponding to the NRZ data signal and a second signal corresponding to the clock signal;
   there is a DC offset between the first and second signals;
   the NRZ data signal is a trunk NRZ data signal; and
   the apparatus further comprises a multiplexer configured to combine two or more tributary NRZ data signals into the trunk NRZ data signal.

29. The apparatus of claim 28, wherein the multiplexer is further configured to generate the clock signal.

30. The apparatus of claim 29, wherein the multiplexer includes a phase-locked loop circuit configured to lock the phase of the clock signal to the trunk NRZ data signal.

31. An apparatus for converting a non-return-to-zero (NRZ) data signal to a return-to-zero (RZ) data signal, the apparatus comprising:
   an amplifier configured to generate an amplified RZ data signal corresponding to the NRZ data signal based on (i) the NRZ data signal and (ii) a clock signal synchronized with the NRZ data signal, wherein:
      the amplifier is a differential amplifier configured to generate the amplified RZ data signal based on a comparison between a first signal corresponding to the NRZ data signal and a second signal corresponding to the clock signal; and
      there is a DC offset between the first and second signals; and
   a multiplexer configured to combine two or more tributary NRZ data signals into the NRZ data signal, wherein:
      the amplifier is a differential amplifier, comprising a constant current source and two switches connected to the current source, wherein the first signal and the second signal are applied to said two switches to generate the amplified RZ data signal based on a comparison between said first and second signals.

32. The apparatus of claim 31, further comprising
   a laser configured to generate continuous wave light emission; and
   an electro-optic (E/O) modulator configured to receive an optical input from the laser and to modulate said optical input using the amplified RZ data signal to output an optical RZ data signal corresponding to the amplified RZ data signal.

* * * * *

UNITED STATES PATENT AND TRADEMARK OFFICE
CERTIFICATE OF CORRECTION

PATENT NO.       : 7,155,130 B2
APPLICATION NO.  : 10/085433
DATED            : December 26, 2006
INVENTOR(S)      : Yves L. Baeyens et al.

It is certified that error appears in the above-identified patent and that said Letters Patent is hereby corrected as shown below:

In column 5, line 66, replace "ioop" with --loop--.

Signed and Sealed this

Twenty-seventh Day of February, 2007

JON W. DUDAS
*Director of the United States Patent and Trademark Office*